United States Patent [19]

Behr

[11] Patent Number: 4,914,263

[45] Date of Patent: * Apr. 3, 1990

[54] MAGNETICALLY-DAMPED, TESTABLE ACCELEROMETER

[75] Inventor: Leonard W. Behr, Pontiac, Mich.

[73] Assignee: Automotive Systems Laboratory, Inc., Farmington Hills, Mich.

[*] Notice: The portion of the term of this patent subsequent to May 2, 2006 has been disclaimed.

[21] Appl. No.: 317,652

[22] Filed: Mar. 1, 1989

Related U.S. Application Data

[63] Continuation of Ser. No. 248,143, Sep. 23, 1988, Pat. No. 4,827,091.

[51] Int. Cl.$^4$ .............................................. H01H 35/14
[52] U.S. Cl. ........................... 200/61.45 M; 200/61.53
[58] Field of Search ................. 200/61.45 R, 61.45 M, 200/61.53; 335/205

[56] References Cited

U.S. PATENT DOCUMENTS

| | | | |
|---|---|---|---|
| 2,603,726 | 7/1952 | McLean | 200/61.53 |
| 3,132,220 | 5/1964 | Uri et al. | 200/61.53 X |
| 3,459,911 | 8/1969 | Fischer | 200/61.45 R |
| 4,093,836 | 6/1978 | Ewy et al. | 200/61.53 |
| 4,329,549 | 5/1982 | Breed | 200/61.53 X |
| 4,827,091 | 5/1989 | Behr | 200/61.45 M |

Primary Examiner—J. R. Scott
Attorney, Agent, or Firm—Lyon & Delevie

[57] ABSTRACT

An acceleration sensor comprises a housing having a magnetically permeable element, such as a steel washer, secured thereto proximate with an end of a cylindrical passage formed therein; a magnetic sensing mass in the passage which is displaced in response to acceleration of the housing from an initial position within the passage proximate the steel washer to a second position within the passage when such acceleration overcomes the magnetic bias of the sensing mass towards the steel washer; a pair of electrically conductive rings encompassing the passage so as to provide magnetic damping for the sensing mass during the displacement thereof; and a pair of beam contacts projecting from the housing into the passage so as to be bridged by the sensing mass when the sensing mass is displaced to the second position within the passage. The accelerometer further comprises a pair of oppositely-wound electrical coils encompassing the passage proximate the initial position and the second position of the sensing mass therein, respectively. Upon the delivery of a direct current to the coils, the sensing mass is magnetically biased to the second position within the passage, whereby the beam contacts are bridged by the sensing mass to confirm the operability of the sensor.

2 Claims, 2 Drawing Sheets

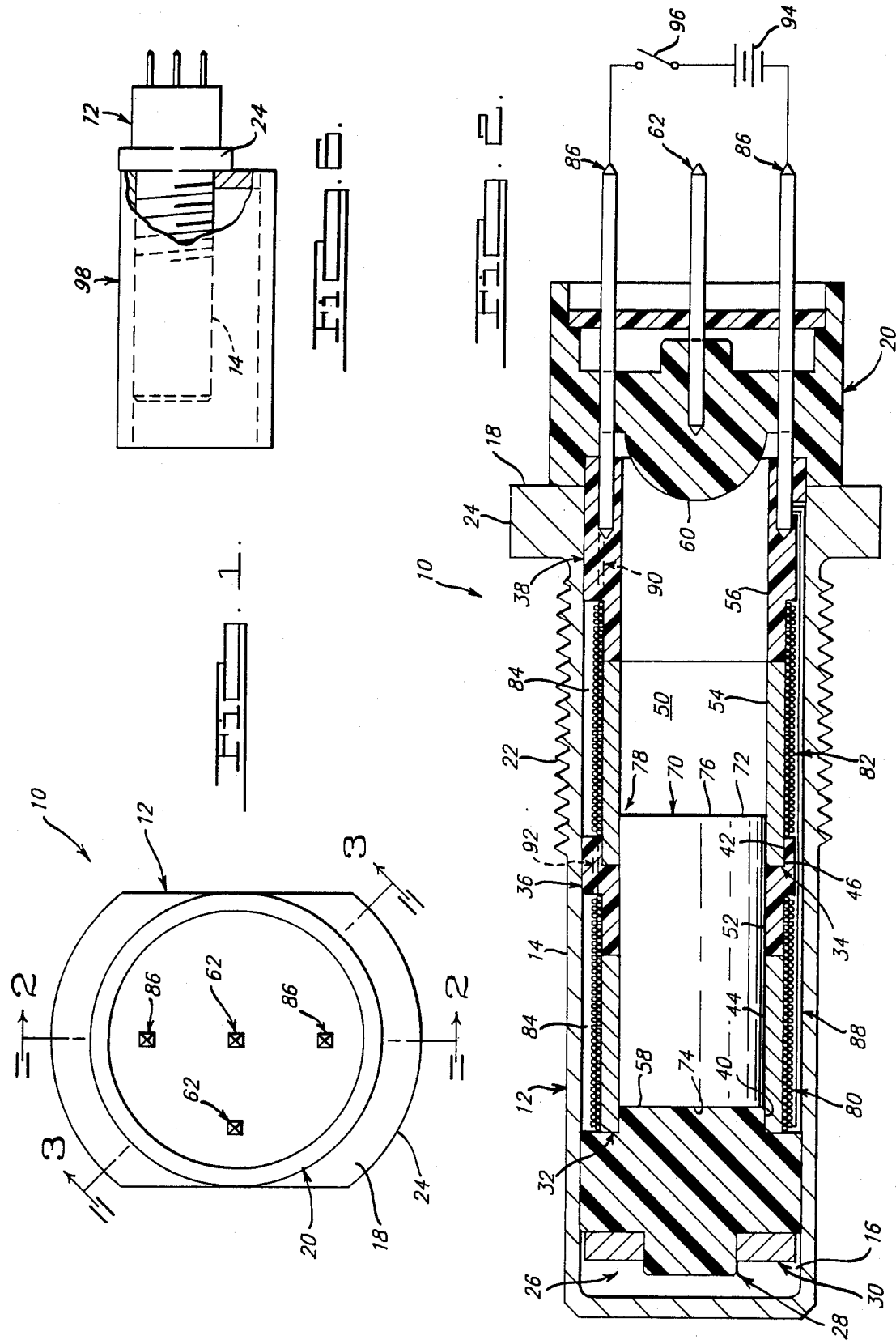

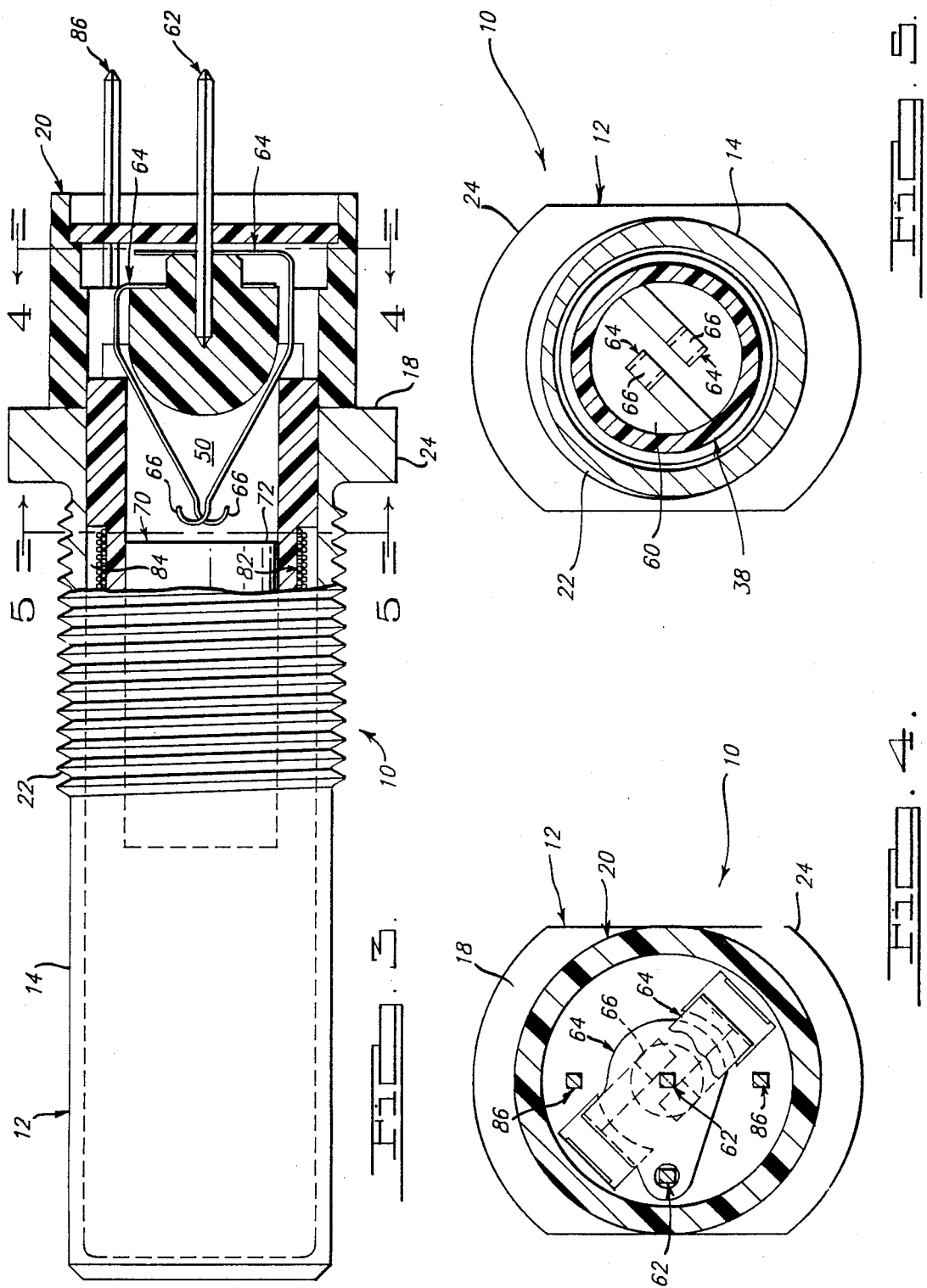

MAGNETICALLY-DAMPED, TESTABLE ACCELEROMETER

This is a continuation of co-pending application Ser. No. 248,143 filed on Sept. 23, 1988 now U.S. Pat. No. 4,827,091.

BACKGROUND OF THE INVENTION

The instant invention relates to means for sensing the acceleration profile of an object, such as a motor vehicle.

The prior art teaches acceleration sensors, or accelerometers, comprising a housing having an inertial or sensing mass within a cylindrical passage therein which is biased by suitable biasing means towards a first end of the passage. When the housing is subjected to an accelerating force which exceeds the threshold biasing force of the biasing means, the sensing mass moves along the passage away from the first end thereof toward a second position at the other end thereof, with such movement being retarded by suitable damping means therefor. Where the acceleration input is of sufficient magnitude and duration to displace the sensing mass to the second position within the passage, the sensing mass triggers switch means in the sensor, as by bridging a pair of electrical contacts therein, whereupon an instrumentality connected with the switch means, such as a vehicle passenger restraint system, is actuated. In this manner, the sensor mechanically integrates the acceleration input to the housing.

The prior art teaches a variety of spring and magnetic biasing means for biasing the sensing mass towards the first end of the passage and away from the switch means incorporated in the sensor. The use of springs, however, is discouraged due to the potential failure thereof due to breakage, whereupon the sensing mass is free to trigger the switch means when the housing is subjected to a de minimis accelerating force.

An accelerometer employing magnetic biasing means is taught in U.S. Pat. No. 4,329,549, issued May 11, 1982 to Breed, wherein a magnet secured to the housing proximate the first end of the passage exerts a magnetic biasing force on a magnetically permeable sensing mass, with the movement of the sensing mass being damped by a gas contained within the passage. Such magnetic biasing of the sensing mass offers the advantage of providing a maximum biasing force on the sensing mass when the sensing mass is in its initial position proximate the first end of the passage. However, as the sensing mass moves along the passage from its initial position therein towards the second position therein, the gas damping force quickly predominates in retarding the movement of the sensing mass. Thus, it will be readily appreciated that, upon the loss of the damping gas due to the failure of the seal which operates to maintain the gas within the passage, any acceleration exceeding the initial magnetic biasing threshold will cause the sensing mass to be fully displaced to the second position within the passage, thereby triggering the switch means of the sensor. In other words, an accelerometer constructed in accordance with the '549 patent is not able to properly mechanically integrate acceleration inputs thereto in the absence of the damping gas. Additionally, it is significant that the use of gas damping requires extreme tolerance control of the gap between the walls of the passage and the sensing mass thereof, thereby increasing manufacturing costs.

It is noted that electrical circuits incorporating the switch means of such known accelerometers typically employ a resistor to shunt the leads therefrom in order to provide circuit diagnosability. It will be readily appreciated, however, that circuit diagnostics are incapable of detecting the failure of such sensors in the "open" condition, e.g., when the sensing mass is unable to move to the second position within the passage, or when a change occurs in the damping characteristic of the sensor, as the shunting resistor will continue to indicate a fully functional sensor. Thus, the ability to test the operation of the sensor itself becomes critical to confirming the operability and, hence, reliability of a system incorporating such a sensor.

SUMMARY OF THE INVENTION

It is the object of the instant invention to provide a magnetically-biased accelerometer which employs magnetic damping to obviate the extreme manufacturing tolerances typical of prior art gas-damped accelerometers.

A further object of the instant invention is to provide an accelerometer having means incorporated therein for testing its operability.

The accelerometer of the instant invention comprises a housing having a cylindrical passage formed therein and a magnetically permeable element, such as a steel washer, secured to the housing proximate with the passage therein. A magnetic sensing mass within the passage is magnetically biased towards the washer so as to remain in an initial position within the passage proximate with the washer until the magnetic bias is overcome by acceleration of the housing, whereupon the sensing mass is displaced in response to such acceleration towards a second position within the passage. The magnetic bias is sufficient to return the sensing mass to the initial position within the passage from any other position therein short of the second position upon a reduction in the acceleration input to the housing.

The instant accelerometer further comprises switchable magnetic biasing means for displacing the sensing mass to the second position within the passage without regard to acceleration of the housing, such as an electrical coil which encompasses the housing and switchable means for delivering a unidirectional current pulse through the coil; and magnetic damping means for retarding the displacement of the sensing mass within the passage, such as a plurality of axially spaced, electrically conductive rings encompassing the passage. The displacement of the sensing mass within the passage induces an electric current in each ring which varies with the rate of such sensing mass displacement relative thereto and the distance of the sensing mass therefrom. The electric current induced in each ring in turn generates a magnetic field which interacts with the sensing mass to retard the displacement thereof.

A switch means on said housing is operated by the sensing mass when the sensing mass is displaced to the second position within the passage. For example, in a preferred embodiment of the instant accelerometer, the switch means comprises a pair of electrically conductive beams secured relative to the housing so as to project into the passage for engagement with an electrically conductive surface of the sensing mass upon displacement of the sensing mass to the second position within the passage. Preferably, the beams are formed of a bimetallic material so as to permit the free ends thereof to move axially of the passage in response to changes in sensor temperature, whereby the distance from the initial position within the passage to the second position therein is adjusted to compensate for changes in the magnetic damping force due to temperature effects on the magnetic flux density generated by the sensing mass and the resistance of the magnetic damping rings.

BRIEF DESCRIPTION OF THE DRAWINGS

FIG. 1 is an end view of a vehicle accelerometer constructed in accordance with the instant invention;

FIG. 2 is a longitudinal view in cross-section of the accelerometer along line 2—2 of FIG. 1 with the contact beams thereof removed and showing the magnetic sensing mass thereof in its initial position within the passage proximate the stop of a battery switchably connected across the input terminals thereof;

FIG. 3 is a longitudinal view in cross-section, partially broken away, of the accelerometer along line 3—3 of FIG. 1 showing the magnetic sensing mass thereof displaced within the passage to a position short of the second position therein by an acceleration input to the accelerometer housing;

FIG. 4 is a cross-sectional view, partially broken away, of the accelerometer along line 4—4 of FIG. 3;

FIG. 5 is a cross-sectional view of the accelerometer along line 5—5 of FIG. 3; and FIG. 6 shows the accelerometer encapsulated by a magnetic shroud, the longitudinal axis of which is parallel with, but offset from, the longitudinal axis of the passage, whereby the effects of gravity and external magnetic fields and materials on the sensing mass are minimized.

DETAILED DESCRIPTION OF THE PREFERRED EMBODIMENT OF THE INVENTION

Referring to drawings, a vehicle accelerometer 10 constructed in accordance with the instant invention comprises a housing 12 having a body portion 14 formed of a non-magnetic material such as non-magnetic stainless steel or plastic. The housing body 14 has a cylindrical cavity 16 extending longitudinally therein from an end 18 thereof. The housing 12 further comprises a cap 20 formed of an electrically insulating material such as plastic which is secured to the end 18 of the housing body 14 as by bonding with a suitable adhesive, whereby the housing cavity 16 is sealed during final assembly of the accelerometer 10. It is significant to note that the integrity of the seal thus formed between the cap 20 and the housing body 14 is not critical to the continued operation of the instant accelerometer 10. An external thread 22 and external flange 24 on the housing body 14 facilitate the mounting of the accelerometer 10 on a motor vehicle (not shown).

A stop 26 comprising a cylindrical insulating plug 28 and a magnetically permeable element, such as a steel washer 30, is secured as by press-fitting within the housing cavity 16. A first sleeve or ring 32 formed of a non-magnetic, electrically conductive material such as copper and having an outer diameter less than the inner diameter of the housing cavity 16 is positioned therein so as to abut the stop 26. A second copper ring 34 of like inner and outer diameter as the first ring 32 is positioned within the housing cavity 16 and axially spaced from the first ring 32 by a first annular spacer 36. The first spacer 36, which is of like inner diameter as the rings 32 and 34, and is secured within the housing cavity 16 as by press-fitting, serves to electrically isolate the first ring 32 from the second ring 34, for reasons discussed hereinbelow. A second insulative spacer 38, also of like inner diameter as the rings 32 and 34, is positioned within the housing cavity 16 so as to abut the second ring 34 therein, and is secured within the housing cavity 16 as by press-fitting. Upon final assembly of the accelerometer 10, the second spacer 38 abuts the cap 20 of the housing 12, whereby additional support is provided therefor.

The rings 32 and 34 are thus axially secured relative to the housing cavity 16 by the stop 26 and the first spacer 36, and the first and second spacers 36 and 38, respectively, as shown in FIG. 2. Additionally, the stop 26 and the first spacer 36 have stepped outer and inner surfaces 40 and 42 thereon, respectively, which engage with the inner surface 44 of the first ring 32 and the outer surface 46 of the second ring 34, respectively, whereby the rings 32 and 34 are maintained in concentricity with the housing cavity 16.

A right circular cylindrical passage 50 is thus defined within the housing 12 by the inner surfaces 44, 52, 54, and 56 of the first ring 32, first spacer 36, second ring 34 and second spacer 38, respectively. The first end 58 of the passage 50 is defined by the stop 26, whereby the washer 30 is placed in proximity with, but electrically isolated from, the passage 50. The second end 60 of the passage 50 is defined by the cap 20 of the housing 12.

Referring to FIGS. 3–5, a first pair of electrical terminals 62 extends through the cap 20 to comprise the electrical leads for a pair of electrically conductive beams or contacts 64, the free ends 66 of which project from the cap 20 into the passage 50 proximate with the second end 60 thereof. The beams 64 preferably comprise bimetallic strips formed, for example, of copper and stainless steel. The beams 64 are thus able to move axially of the passage 50 in response to changes in the temperature thereof, whereby the response of the instant accelerometer is adjusted for temperature effects thereon, as discussed hereinbelow.

A right circular cylindrical sensing mass 70 formed of a magnetic material comprising, for example, neodymium, iron and boron is encapsulated within the passage 50 of the housing 12. The sensing mass 70 is magnetized longitudinally, whereby the magnetic poles 72 and 76 thereof are disposed at the longitudinal ends thereof, respectively. The sensing mass 70 is maintained in an initial position within the passage 50 adjacent to the stop 26 and, thus, proximate the washer 30 due to the magnetic attraction between the sensing mass 70 and the washer 30. This magnetic bias on the sensing mass 70 is overcome when the housing 12 is subjected to an accelerating force which exceeds a threshold value, whereupon the sensing mass 70 is displaced in response to such acceleration towards a second position within the passage 50 proximate with the second end 60 thereof. More specifically, the second position of the sensing mass 70 within the passage 50 is the position therein which results in the engagement of an electrically conductive surface 72 of the sensing mass 70 with the beams 64, whereby the beams 64 are electrically bridged by the sensing mass 70. In as much as the beams 64 move axially of the passage 50 in response to changes in the temperature thereof, the "stroke" of the sensing mass 70, i.e., the distance that the sensing mass 70 must travel to be displaced from its initial position within the passage 50 to the second position therein, is automatically adjusted by the beams 64 so as to compensate for the effects of temperature on the magnetic properties of the sensing mass 70 and the resistance of the rings 32 and 34.

It is noted that the magnetic bias on the sensing mass 70, i.e., the magnetic attraction between the sensing mass 70 and the washer 30, is sufficient to return the sensing mass 70 to its initial position adjacent to the stop 26 from any other position within the passage 50 short of the second position upon a reduction in the accelerating input to the housing 12.

The rings 32 and 34 of the accelerometer 10 provide magnetic damping for the sensing mass 70 which varies in proportion to the rate of such displacement of the sensing mass 70. More specifically, the rings 32 and 34 provide a magnetic field which opposes such displacement of the sensing mass 70 through the inducement therein of an electric current by the magnetic field of the sensing mass 70.

It is noted that, in the preferred embodiment 10 of the instant accelerometer, the first ring 32 is positioned longitudinally of the passage 50 so as to be proximate with a magnetic pole 72 of the sensing mass 70 when the sensing mass 70 is in its initial position within the passage 50. Similarly, the second ring 34 encompasses the passage 50 so as to be proximate with the other magnetic pole 76 of the sensing mass 70 when the sensing mass 70 is in its initial position. The rings 32 and 34 are electrically isolated from one another by the first spacer 36 so as to permit the inducement therein of direct currents of different amplitude, with the current induced in the first ring 32 thus being permitted to flow circumferentially therein in a direction opposite that of the current induced in the second ring 34, upon displacement of the sensing mass 70 relative thereto. Variations in the magnetic damping field which result from changes in the resistance of the rings 32 and 34 and the magnetic flux density generated by the sensing mass 70 due to changes in the temperature thereof are accommodated through the adjustment of the stroke of the sensing mass 70 by axial movement of the beams 64, as described hereinabove. The accelerometer 10 thus continues to accurately integrate the acceleration input to the housing 12 notwithstanding changes in the operating temperature thereof.

The electromagnetic damping generated by the interaction between the rings 32 and 34 and the sensing mass 70 obviates the need for extreme manufacturing tolerances with respect to the gap 78 between the sensing mass 70 and the surfaces 42, 52, 54, and 56 defining the passage 50. For example, the gap 78 between the magnetic sensing mass 70 and the surfaces defining the passage 50 may be on the order of ten to twenty thousandths of an inch, in contrast with a gap of perhaps only twenty microns which is typically required in prior art gas-damped sensors. Moreover, since the magnetic damping employed by the instant accelerometer 10 is unaffected by a breach of the seal formed between the housing body 14 and the cap 20, there is no inherent failure mode as in such prior art gas-damped sensors.

A pair of first and second electrical coils 80 and 82 are wound in opposite directions around the first and second rings 32 and 34, respectively, so as to be disposed in the annular space 84 between the outer surfaces of the rings 32 and 34, and the housing cavity 16. Thus, the first coil 80 encompasses the passage 50 proximate with the initial position of the sensing mass 70 within the passage 50, and the second coil 82 encompasses the passage 50 proximate with the second position of the sensing mass 70 therein. A second pair of electrical terminals 86 extends through the cap 20 and into the second spacer 38 for connection with the first and second coils 80 and 82, respectively, by wires 88 and 90, respectively, as illustrated in FIG. 2. The output of the first coil 80 is connected to the input of the second coil 82 by a wire 92 extending therebetween, whereby the circuit between the second pair of terminals 86 is completed.

Referring to FIG. 2, the operability of the accelerometer is tested by delivering a unidirectional current pulse through the coils 80 and 82 by switchably applying a voltage potential across the second pair of terminals 86 thereof, as by connecting a battery 94 thereacross by means of a switch 96. The resulting magnetic field overrides the magnetic bias on the sensing mass 70 due to the magnetic attraction of the sensing mass 70 to the washer 30, whereupon the sensing mass 70 is displaced from its initial position, or any position between its initial position and the second position, to the second position within the passage 50. Upon reaching the second position, the electrically conductive surface 72 of the sensing mass 70 bridges the free ends 66 of the beams 64, whereby full sensor function is confirmed.

It is noted that the direction of current flow through the coils may be reversed to increase the force biasing the sensing mass towards its initial position within the passage.

FIG. 6 shows the housing body 14 of the instant accelerometer 10 encapsulated by a tubular magnetic shroud 98. The shroud 98 acts to shield the sensing mass 70 from magnetic fields and materials external to the accelerometer 10. It is noted that, while the shroud 98 may magnetically interact with the sensing mass 70 so as to force it into engagement with the surfaces 44, 52, 54 and 56 defining the passage 50, such engagement may nonetheless be preferable to the unpredictable effects on sensor response due to such external magnetic fields and materials. Moreover, the shroud 98 may be asymmetrically positioned about the housing 12, as shown in FIG. 6, so that the magnetic interaction between the shroud 98 and the sensing mass 70 tends to counter the force of gravity on the latter, whereby the engagement between the sensing mass 70 and the passage surfaces 44, 52, 54, and 56 due to gravity is also minimized.

While the preferred embodiment of the invention has been disclosed, it should be appreciated that the invention is susceptible of modification without departing from the spirit of the invention or the scope of the subjoined claims.

I claim:
1. An accelerometer comprising
   a housing having a passage formed therein;
   a magnetically permeable element secured to said housing proximate with said passage;
   a magnetic sensing mass within said passage, said sensing mass being magnetically biased towards said element so as to remain in an initial position within said passage proximate with said element until said magnetic bias is overcome by acceleration of said housing, whereupon said sensing mass is displaced in response to such acceleration towards a second position within said passage, said magnetic bias being sufficient to return said sensing mass to said initial position from any other position short of said second position;
   switchable means for increasing the magnetic bias on said sensing mass; and switch means on said housing operable by said sensing mass when said sensing mass is displaced to said second position within said passage.

2. The accelerometer of claim 1 wherein said switchable means for increasing the magnetic bias on said sensing mass comprises an electrical coil proximate with said passage and switchable means for delivering a direct current through said coil.

* * * * *